(12) United States Patent
Moon et al.

(10) Patent No.: US 9,833,101 B2
(45) Date of Patent: Dec. 5, 2017

(54) PAN AND METHOD FOR MAKING

(71) Applicant: NuWave, LLC, Libertyville, IL (US)

(72) Inventors: Jung S. Moon, Long Grove, IL (US); Byung G. Choi, Lake Villa, IL (US); Mikale K. Kwon, Hoffman Estates, IL (US)

(73) Assignee: NuWave, LLC, Libertyville, IL (US)

( * ) Notice: Subject to any disclaimer, the term of this patent is extended or adjusted under 35 U.S.C. 154(b) by 281 days.

(21) Appl. No.: 14/556,059

(22) Filed: Nov. 28, 2014

(65) Prior Publication Data

US 2015/0083711 A1    Mar. 26, 2015

Related U.S. Application Data

(63) Continuation-in-part of application No. 29/472,784, filed on Nov. 15, 2013, now Pat. No. Des. 34,091, (Continued)

(51) Int. Cl.
*A47J 36/02*    (2006.01)
*A47J 27/00*    (2006.01)
*H05B 6/12*    (2006.01)

(52) U.S. Cl.
CPC ............ *A47J 27/002* (2013.01); *A47J 36/02* (2013.01); *H05B 6/1209* (2013.01); *Y10T 29/4902* (2015.01)

(58) Field of Classification Search
CPC   A47J 27/002; A47J 36/02; A47J 36/20; A47J 37/10; H05B 6/1209; H05B 6/12;
(Continued)

(56) References Cited

U.S. PATENT DOCUMENTS

D97,879 S     12/1935 Worthington et al.
D155,422 S    10/1949 Henderson
(Continued)

FOREIGN PATENT DOCUMENTS

CN    3151577    6/2000
CN    3166031    11/2000
(Continued)

OTHER PUBLICATIONS

International Search Report from PCT/US2011/057408, dated Feb. 23, 2012.

*Primary Examiner* — Dana Ross
*Assistant Examiner* — Thomas Ward
(74) *Attorney, Agent, or Firm* — Bishop Diehl & Lee, Ltd.

(57) ABSTRACT

In an exemplary embodiment, an induction cooking pan can include: a pan; a handle coupled to the pan; wherein the pan can include: a ceramic inner coated portion; a first metallic outer portion; and a second metallic outer portion; wherein the second metallic outer portion is at least one of extruded or impact bonded to the first metallic outer portion; wherein the second metallic outer portion can include: a generally circular shape and can include a plurality of punched openings therethrough; and wherein the plurality of punched openings have been at least one of: impact bonded into a lower surface of the first metallic portion; or extruded into a lower surface of the first metallic portion; and wherein the first and second metallic outer portions have been machined substantially smooth.

22 Claims, 8 Drawing Sheets

Related U.S. Application Data which is a continuation-in-part of application No. 29/410,001, filed on Jan. 2, 2012, now Pat. No. Des. 693,627, which is a continuation-in-part of application No. 13/277,212, filed on Oct. 19, 2011, now Pat. No. 9,226,343.

(60) Provisional application No. 62/064,969, filed on Oct. 16, 2014, provisional application No. 61/470,493, filed on Apr. 1, 2011.

(58) Field of Classification Search
CPC ....... H05B 6/062; H05B 6/1263; H01F 41/00; H01F 17/0013; Y10T 29/4902; H01G 7/023; B22F 2998/00; B65D 25/14; Y02B 40/126
USPC .......... 219/620–627; 29/602.1, 592.1, 527.2; 99/422, 403; 126/390.1; 220/573.1, 220/573.2, 62.17, 62.13
See application file for complete search history.

(56) References Cited

U.S. PATENT DOCUMENTS

| | | | |
|---|---|---|---|
| D206,606 S | 1/1967 | Brown | |
| 3,843,857 A | 10/1974 | Cunningham | |
| 3,947,652 A | 3/1976 | Cobb | |
| 4,169,222 A | 9/1979 | Tucker | |
| 4,308,443 A | 12/1981 | Tucker et al. | |
| 4,446,350 A | 5/1984 | Mizukawa et al. | |
| 4,511,781 A | 4/1985 | Tucker et al. | |
| 4,536,631 A | 8/1985 | Tazima et al. | |
| 4,556,770 A | 12/1985 | Tazima et al. | |
| 4,638,135 A | 1/1987 | Aoki | |
| D309,844 S | 8/1990 | Storsberg | |
| 5,134,265 A | 7/1992 | Dickens et al. | |
| D334,108 S | 3/1993 | Fisher | |
| 5,280,152 A | 1/1994 | Lee | |
| D347,548 S | 6/1994 | Boehm et al. | |
| 5,363,748 A | 11/1994 | Boehm et al. | |
| 5,408,073 A | 4/1995 | Jeong | |
| 5,447,803 A * | 9/1995 | Nagaoka | A47J 36/02 204/192.11 |
| 5,448,038 A | 9/1995 | Kime | |
| 5,486,683 A | 1/1996 | Shimizu et al. | |
| 5,512,733 A | 4/1996 | Takikawa et al. | |
| 5,564,590 A * | 10/1996 | Kim | A47J 36/02 126/390.1 |
| 5,648,008 A | 7/1997 | Barritt et al. | |
| 5,768,979 A | 6/1998 | Antoine | |
| D407,600 S | 4/1999 | LoGiudice | |
| D411,937 S | 7/1999 | Siegler et al. | |
| D413,760 S | 9/1999 | Tsai et al. | |
| D419,823 S | 2/2000 | Choi | |
| D434,269 S | 11/2000 | Jo | |
| 6,360,423 B1 * | 3/2002 | Groll | A47J 36/02 220/573.1 |
| 6,384,387 B1 | 5/2002 | Owens et al. | |
| D463,950 S | 10/2002 | Wu | |
| D464,230 S | 10/2002 | Wu | |
| D467,766 S | 12/2002 | Wanat et al. | |
| 6,617,554 B2 | 9/2003 | Moon et al. | |
| 6,715,631 B2 * | 4/2004 | Kim | A47J 27/002 220/573.1 |
| 6,805,312 B2 | 10/2004 | Capp | |
| D500,630 S | 1/2005 | Brasset | |
| D504,047 S | 4/2005 | Schmidt et al. | |
| 6,906,295 B2 * | 6/2005 | Ge | C23C 14/0641 219/621 |
| 6,926,971 B2 * | 8/2005 | Groll | A47J 36/02 220/573.1 |
| 6,942,935 B2 * | 9/2005 | Ge | A47J 36/04 428/212 |
| 6,949,723 B2 | 9/2005 | Staebler et al. | |
| D519,776 S | 5/2006 | Chen | |
| D522,306 S | 6/2006 | Wilgus et al. | |
| D533,392 S | 12/2006 | Yeung | |
| 7,183,525 B2 | 2/2007 | Fuchs | |
| D543,410 S | 5/2007 | Cohen et al. | |
| D544,294 S | 6/2007 | Lee | |
| D555,421 S | 11/2007 | Thurlow et al. | |
| D564,293 S | 3/2008 | Wasserman et al. | |
| 7,355,150 B2 | 4/2008 | Baarman et al. | |
| 7,390,994 B2 | 6/2008 | Oh et al. | |
| D575,576 S | 8/2008 | Chao | |
| D580,214 S | 11/2008 | Dodane | |
| 7,488,515 B2 * | 2/2009 | Groll | A47J 27/002 427/294 |
| D589,744 S | 4/2009 | Rae | |
| D618,052 S | 6/2010 | Rae | |
| 7,752,958 B2 | 7/2010 | Cohen et al. | |
| D630,055 S | 1/2011 | Rae | |
| 7,906,221 B2 * | 3/2011 | Groll | A47J 36/02 220/573.1 |
| D635,392 S | 4/2011 | Shantha et al. | |
| D638,260 S | 5/2011 | Lin | |
| D639,604 S | 6/2011 | Degnan | |
| D639,605 S | 6/2011 | Degnan | |
| D642,420 S | 8/2011 | Lavy et al. | |
| D643,673 S | 8/2011 | Lavy et al. | |
| D643,676 S | 8/2011 | Lavy et al. | |
| D643,677 S | 8/2011 | Lavy et al. | |
| D643,678 S | 8/2011 | Lavy et al. | |
| 8,021,768 B2 * | 9/2011 | Ge | A47J 36/02 219/621 |
| D651,448 S | 1/2012 | Moon et al. | |
| D656,358 S | 3/2012 | Cloutier et al. | |
| D658,004 S | 4/2012 | Rae | |
| D667,689 S | 9/2012 | Rae | |
| D667,691 S | 9/2012 | Rae | |
| D677,516 S | 3/2013 | Cloutier | |
| D682,013 S | 5/2013 | Huang | |
| D684,420 S | 6/2013 | Montgomery | |
| D693,627 S | 11/2013 | Moon et al. | |
| D696,059 S | 12/2013 | Bourbeau | |
| D704,505 S | 5/2014 | Clabots | |
| D705,000 S | 5/2014 | Rae | |
| 9,060,639 B2 * | 6/2015 | Groll | A47J 36/02 |
| 2003/0210106 A1 | 11/2003 | Cheng | |
| 2004/0060936 A1 | 4/2004 | Logiudice | |
| 2005/0258168 A1 | 11/2005 | Fuchs | |
| 2008/0142526 A1 * | 6/2008 | Cheng | A47J 36/025 220/573.1 |
| 2008/0223852 A1 | 9/2008 | Bassill et al. | |
| 2009/0014438 A1 | 1/2009 | Ohashi et al. | |
| 2009/0065498 A1 * | 3/2009 | Beverly | A47J 36/02 219/621 |
| 2009/0065500 A1 * | 3/2009 | England | A47J 27/002 219/621 |
| 2009/0289054 A1 | 11/2009 | Williams et al. | |
| 2010/0083949 A1 * | 4/2010 | Lisheng | A47J 36/02 126/390.1 |
| 2010/0242257 A1 * | 9/2010 | Huang | A47J 27/002 29/592 |
| 2011/0041708 A1 * | 2/2011 | Groll | A47J 27/002 99/422 |
| 2011/0073602 A1 * | 3/2011 | Musil | A47J 27/002 220/573.2 |
| 2011/0308989 A1 * | 12/2011 | Berrux | A47J 27/002 206/524.3 |
| 2012/0305546 A1 | 12/2012 | Fillippa | |
| 2013/0068775 A1 * | 3/2013 | Maravic | A47J 27/002 220/573.1 |
| 2013/0112683 A1 | 5/2013 | Hegedis et al. | |
| 2014/0158678 A1 | 6/2014 | Thomann | |

FOREIGN PATENT DOCUMENTS

| | | |
|---|---|---|
| CN | 3219345 | 1/2002 |
| CN | 3301301 | 6/2003 |
| CN | 3329082 | 10/2003 |
| CN | 3333598 | 11/2003 |

(56) References Cited

FOREIGN PATENT DOCUMENTS

| | | |
|---|---|---|
| CN | 3333604 | 11/2003 |
| CN | 3342801 | 12/2003 |
| CN | 3342830 | 12/2003 |
| CN | 3358021 | 3/2004 |
| CN | 3366204 | 5/2004 |
| CN | 3376735 | 7/2004 |
| CN | 3382626 | 8/2004 |
| CN | 3406328 | 11/2004 |
| CN | 3407943 | 12/2004 |
| CN | 3447089 | 5/2005 |
| CN | 3450412 | 6/2005 |
| CN | 3456498 | 6/2005 |
| CN | 3487037 | 11/2005 |
| CN | 3493265 | 12/2005 |
| CN | 3505746 | 2/2006 |
| CN | 3513170 | 3/2006 |
| CN | 3520112 | 4/2006 |
| CN | 3537271 | 6/2006 |
| CN | 3559826 | 9/2006 |
| CN | 3630129 | 4/2007 |
| CN | 3681523 | 8/2007 |
| CN | 300702622 | 10/2007 |
| CN | 301121147 | 1/2010 |
| EP | 1272007 A2 | 1/2003 |
| EP | 2202462 A1 | 6/2010 |
| JP | 1276586 | 11/1989 |
| JP | 2078176 | 3/1990 |
| JP | 2147013 | 6/1990 |
| JP | 2009231175 | 10/2009 |
| WO | 2010002751 A2 | 1/2010 |
| WO | 2012029306 | 3/2012 |
| WO | 2012157189 | 11/2012 |

\* cited by examiner

PAN AND METHOD FOR MAKING

CROSS REFERENCE TO RELATED APPLICATIONS

The present application claims the benefit under 35 USC 119 (e) of U.S. Provisional Patent Application 62/064,969, filed Oct. 16, 2014 and is a continuation-in-part of and claims priority to copending US Design Patent Application 29/472,784, filed Nov. 15, 2013, and is a nonprovisional of and claims the benefit of US Design Patent Application 29/410,001, filed Jan. 2, 2012, which subsequently issued as US Design Patent D693627 on Nov. 19, 2013, which claims priority to U.S. patent application Ser. No. 13/277,212, filed Oct. 19, 2011, which claims the benefit under 35 USC 119 (e) of U.S. Provisional Patent Application 61/470,493, filed Apr. 1, 2011, the contents of all of which are incorporated herein by reference in their entirety, and are of common assignee to the present invention.

BACKGROUND

Field

The present invention relates to cooking pans, and in particular to improved pans for use with induction cooking devices.

Related Art

Cooking pots and pans (hereafter "pans") are well known. Pans can include cast iron pans, stainless steel, anodized aluminum, among various others, as are well known in the art.

Induction cooking has become of increasingly greater interest, particularly with the great popularity of the Precision Induction Cooktop (PIC) available from NUWAVE, LLC of Libertyville, Ill. USA. Induction cookers are safer to use than conventional cookers because there are no open flames. The surface below the cooking vessel is no hotter than the vessel; only the pan generates heat. The control system can shut down the element if a pot is not present or not large enough. Induction cookers are easy to clean because the cooking surface is flat and smooth, even though it may have several heating zones. Since the cooking surface is not directly heated, spilled food does not burn on the surface as with other conventional electric ranges.

Induction cooking heats a cooking vessel with induction heating, instead of infrared radiation from electrical wires or a gas flame as with a traditional cooking stove. For all models of induction cooktop, a cooking vessel must conventionally be made of a ferromagnetic metal such as cast iron or stainless steel. Copper, glass and aluminum vessels can be placed on a ferromagnetic interface disc which enables these materials to be used, but this solution is not always desirable since such a disc may not always be available.

In an induction cooker, a coil of copper wire is placed underneath the cooking surface supporting a cooking pot. An alternating electric current flows through the coil, which produces an oscillating magnetic field. This oscillating magnetic field induces a magnetic flux with a resulting eddy current in the cooking pot equivalent to the electric current in the coil. The eddy current in the metal pot then produces resistive heating which heats the foodstuff in the pot or pan. While the current in the coil is large, the electric current is produced by standard household power supplies.

Thus, unfortunately not all conventional cooking pans work with induction cooking devices. What is needed then is an improved pan for use with induction cooking devices that overcomes shortcomings of conventional cooking pots and pans.

SUMMARY AND OVERVIEW OF EMBODIMENTS

Further features and/or advantages of, as well as the structure and/or operation of, various exemplary embodiments, are described in detail below with reference to the accompanying drawings.

In an exemplary embodiment, an improved cooking pan is provided.

In an exemplary embodiment, an induction cooking pan can include: a pan; a handle coupled to the pan; wherein the pan can include: a ceramic inner coated portion; a first metallic outer portion; and a second metallic outer portion; wherein the second metallic outer portion is at least one of extruded or impact bonded to the first metallic outer portion; wherein the second metallic outer portion can include: a generally circular shape and can include a plurality of punched openings therethrough; and wherein the plurality of punched openings have been at least one of: impact bonded into a lower surface of the first metallic portion; or extruded into a lower surface of the first metallic portion; wherein the first and second metallic outer portions have been machined substantially smooth.

According to another exemplary embodiment, the pan can include where the pan is circular in shape.

According to another exemplary embodiment, the pan can include where the plurality of punched openings can include: punched circular openings.

According to another exemplary embodiment, the pan can include where the first metallic outer portion can include at least one of: an aluminum pan; or an anodized aluminum pan.

According to another exemplary embodiment, the pan can include where the second metallic outer portion can include at least one of: a stainless steel plate.

According to another exemplary embodiment, the pan can include where the stainless steel plate can include the plurality of punched openings, wherein the plurality of punched openings comprise: punched circular openings.

According to another exemplary embodiment, the pan can include where the second metallic outer portion can include the stainless steel plate, and the stainless steel plate can include at least one of: a circular shape; or a similar shape to the bottom surface of the pan.

According to another exemplary embodiment, the pan can include where the ceramic inner coated portion can include: a ceramic coating can include at least one of: a copper color; or a bronze color.

According to another exemplary embodiment, the pan can include where the ceramic inner coated portion can include: a ceramic coating can include a copper color.

According to another exemplary embodiment, the pan can include where the ceramic inner coated portion can include: a ceramic coating can include a green color.

According to another exemplary embodiment, the pan can further include a stainless steel handle.

According to another exemplary embodiment, the pan can include where the stainless steel handle is riveted to the first metallic portion.

According to another exemplary embodiment, the pan can further include a glass cover.

According to another exemplary embodiment, the pan can include where the glass cover can include a metallic handle.

According to another exemplary embodiment, the pan can include where the metallic handle is stainless steel. According to another exemplary embodiment, the pan can include where the stainless steel handle is riveted.

According to another exemplary embodiment, the pan can include where the glass cover further can include: a metallic rim.

According to another exemplary embodiment, the pan can include where the glass cover further can include: a silicone rubber rim.

According to another exemplary embodiment, the pan can include where the silicone rubber rim of the glass cover further can include: a plurality of holes configured for straining.

According to another exemplary embodiment, the pan can include where the pan can include at least one of: a frying pan; a pot; a sauce pan; a single handled pan; a double handled pan; a simmering pan; and a boiling pan.

According to another exemplary embodiment, a method of making a pan can include: cutting a second metallic plate in a shape of a disc; punching holes through the second metallic plate; applying the second metallic plate to a lower surface of a first metallic pan portion can include at least one of: impact bonding; or extruding.

According to another exemplary embodiment, the method of making the pan can include where the first metallic pan portion can include at least one of: aluminum; or anodized aluminum.

According to another exemplary embodiment, the method of making the pan can include where the second metallic plate can include: stainless steel.

According to another exemplary embodiment, the method of making the pan can include where preparing of the second metallic plate can further include flanging said plurality of holes.

According to another exemplary embodiment, the pan can further include a spout.

According to another exemplary embodiment, the pan can further include a long handle and a u-shaped handle.

According to another exemplary embodiment, the pan can further include a cover comprising a vent.

BRIEF DESCRIPTION OF THE DRAWINGS

The foregoing and other features and/or advantages of the invention will be apparent from the following, more particular description of exemplary embodiments of the invention, as illustrated in the accompanying drawings. In the drawings, like reference numbers generally indicate identical, functionally similar, and/or structurally similar elements. A preferred and various other exemplary embodiments are discussed below in the detailed description of the following drawings.

DETAILED DESCRIPTION OF VARIOUS EXEMPLARY EMBODIMENTS

The following detailed description of various preferred exemplary embodiments as well as various other exemplary embodiments, in conjunction with the accompanying claims and/or drawings describes the invention in which like numerals in the several views refer to corresponding or similar parts. The present invention broadly represents applicable improvements to an apparatus and/or methods relating to a vacuum container and pump system or kit. The embodiments detailed herein are intended to be taken as representative or exemplary of those in which the improvements of the embodiments may be incorporated and are not intended to be limiting.

Figure 1:
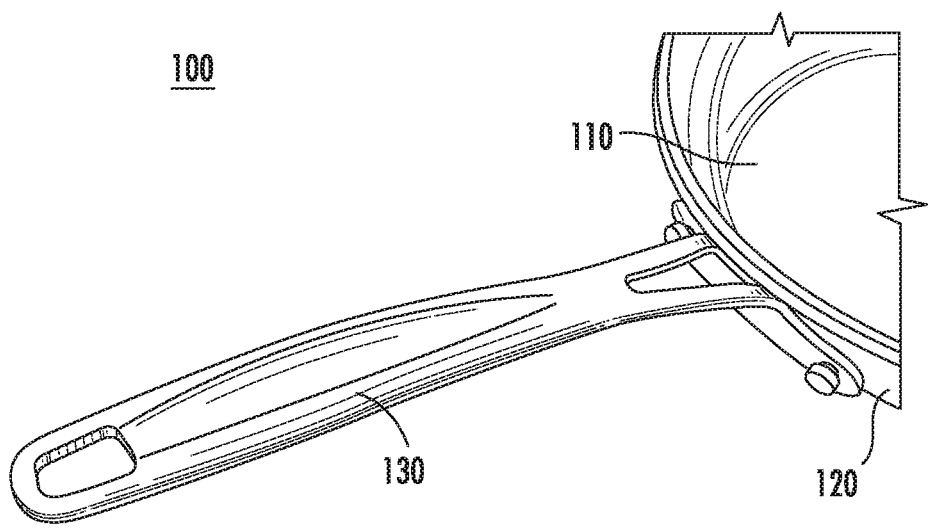
FIG. 1 depicts an exemplary partial color drawing of a bronze color ceramic coated anodized aluminum pan having a stainless steel riveted handle in an isometric perspective view of a pan according to an exemplary embodiment of the present invention.

FIG. 1 depicts an exemplary isometric perspective color drawing according to the preferred embodiment of the present invention 100 which includes a bronze color ceramic coating 110 within the inner portion of an anodized aluminum pan 120 having a stainless steel handle 130 coupled to the outer edge of said anodized aluminum pan 120. The ceramic coating 110 may alternatively be of a copper color.

Figure 2:
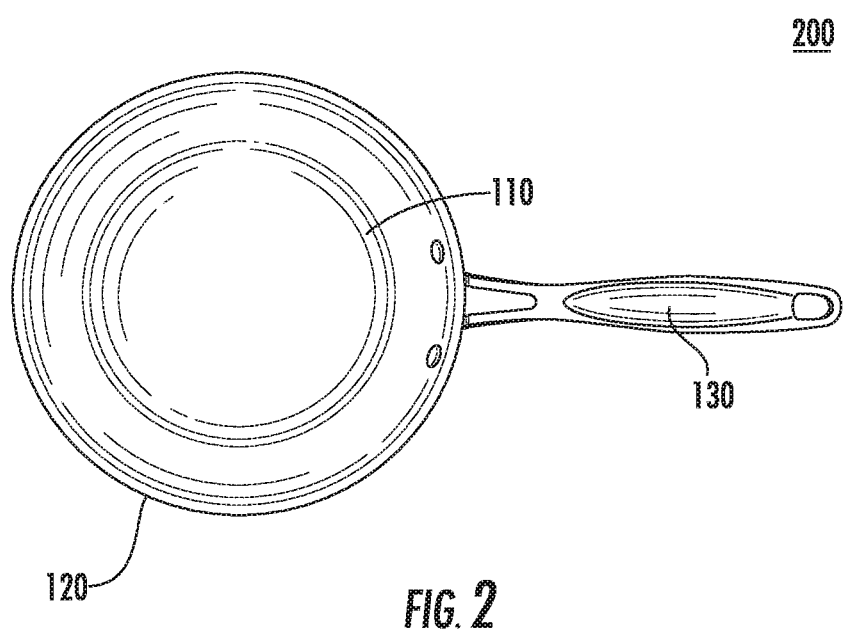
FIG. 2 is a color drawing of a top view of the bronze color ceramic coated pan having a bronze color ceramic coating cooking surface on a pan with stainless steel handle according to an embodiment of the present invention.

FIG. 2 is an exemplary top view 200 color drawing according to the preferred embodiment of the present invention, said top view 200 including the bronze color ceramic coating 110 within the inner portion of an anodized aluminum pan 120 having a stainless steel handle 130 coupled to the outer edge of said anodized aluminum pan 120. The ceramic coating 110 may alternatively be of a copper color.

Figure 3:
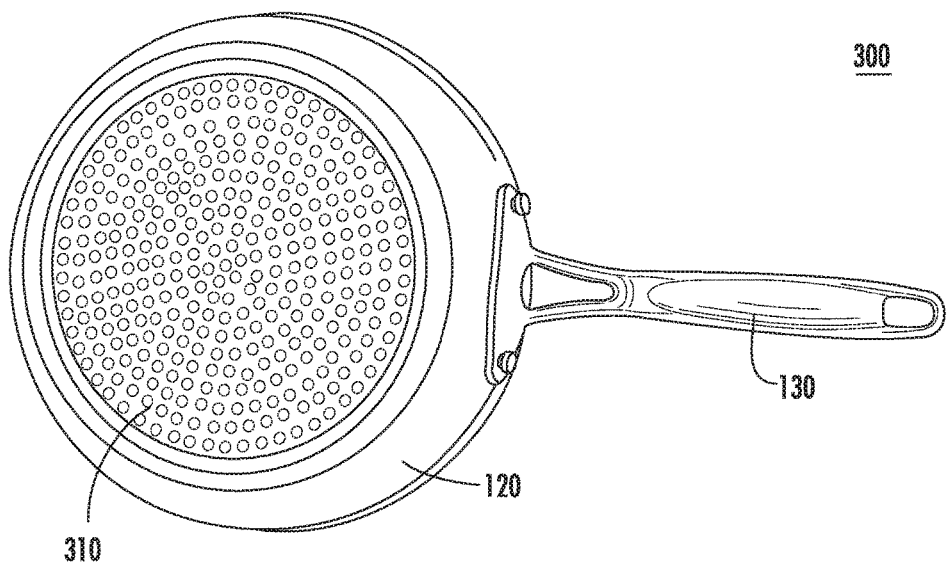
FIG. 3 is a color drawing of a bottom view of a stainless steel base of an anodized aluminum pan color drawing according to an embodiment of the present invention.

FIG. 3 is an exemplary bottom view 300 color drawing according to the preferred embodiment of the present invention, said bottom view 300 including an anodized aluminum pan 120, a stainless steel handle 130 coupled to the outer edge of said anodized aluminum pan 120, and a stainless steel base 310. Said stainless steel base 310 has a plurality of holes within the stainless steel base 310 filled by portions of said anodized aluminum pan 120 through impact bonding or extrusion. Said stainless steel base 310 may alternatively be of a base without a plurality of holes.

Figure 4:
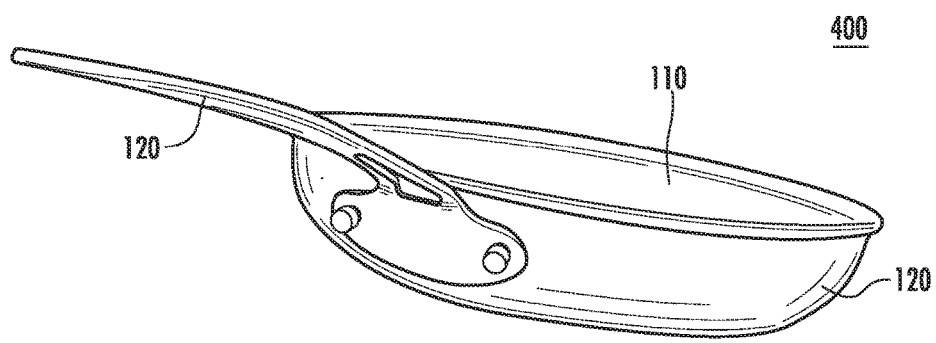
FIG. 4 is an isometric drawing of the back side of the pan, including a view of an exemplary bronze or copper ceramic inner surface, and depicting an exemplary riveted handle attached to the according to an embodiment of the present invention.

FIG. 4 depicts an exemplary isometric perspective color drawing of the back side of the pan according to the preferred embodiment of the present invention 400 which includes said bronze color ceramic coating 110 within the inner portion of an anodized aluminum pan 120 having a stainless steel handle 130 coupled to the outer edge of said anodized aluminum pan 120. The ceramic coating 110 may alternatively be of a copper color.

Figure 5:
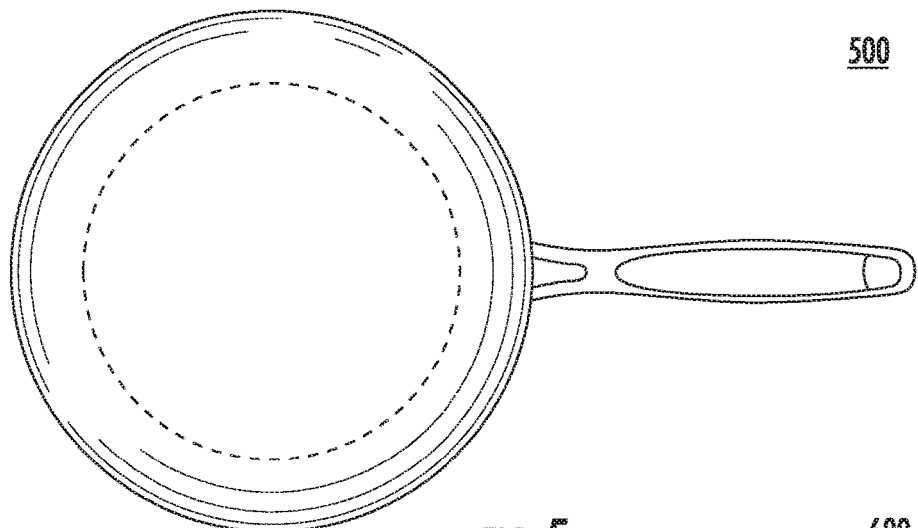
FIG. 5 is a top orthographic view of the pan shown according to an embodiment of the present invention.

FIG. 5 is a top orthographic view 500 of the pan shown according to an embodiment of the present invention.

Figure 6:
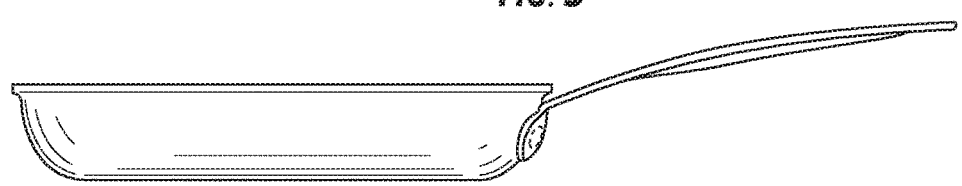
FIG. 6 is a side orthographic view of the pan according to an embodiment of the present invention.

FIG. 6 is a side orthographic view 600 of the pan according to an embodiment of the present invention.

Figure 7:
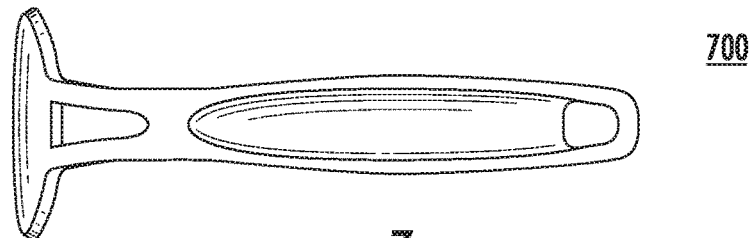
FIG. 7 is a top orthographic view of an embodiment of the handle of the pan according to an embodiment of the present invention.

FIG. 7 is a top orthographic view 700 of an embodiment of the handle of the pan according to an embodiment of the present invention.

Figure 8:
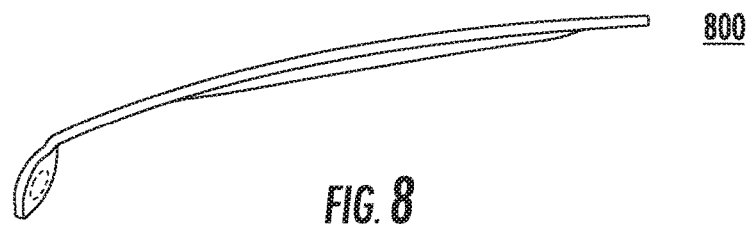
FIG. 8 is a side orthographic view of an embodiment of the handle of the pan according to an embodiment of the present invention.

FIG. 8 is a side orthographic view 800 of an embodiment of the handle of the pan according to an embodiment of the present invention.

Figure 9:
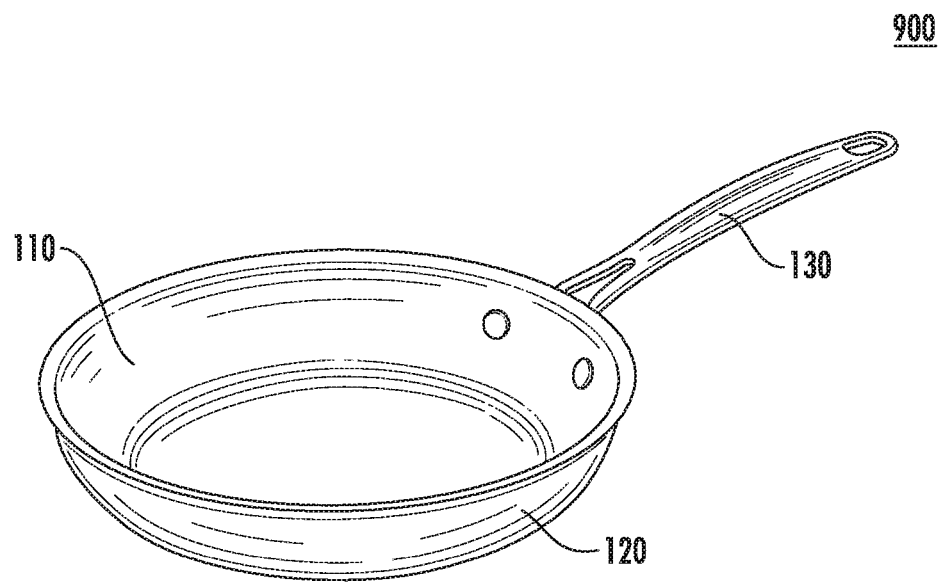
FIG. 9 is another color drawing of an isometric view of a bronze color ceramic coated pan having a bronze or copper color ceramic coating cooking surface on a embodiment of the pan with stainless steel handle according to an embodiment of the present invention.

FIG. 9 is another exemplary isometric perspective color drawing according to the preferred embodiment of the present invention 900 which includes a bronze color ceramic coating 110 within the inner portion of an anodized aluminum pan 120 having a stainless steel handle 130 coupled to the outer edge of said anodized aluminum pan 120. The ceramic coating 110 may alternatively be of a copper color.

Figure 10:
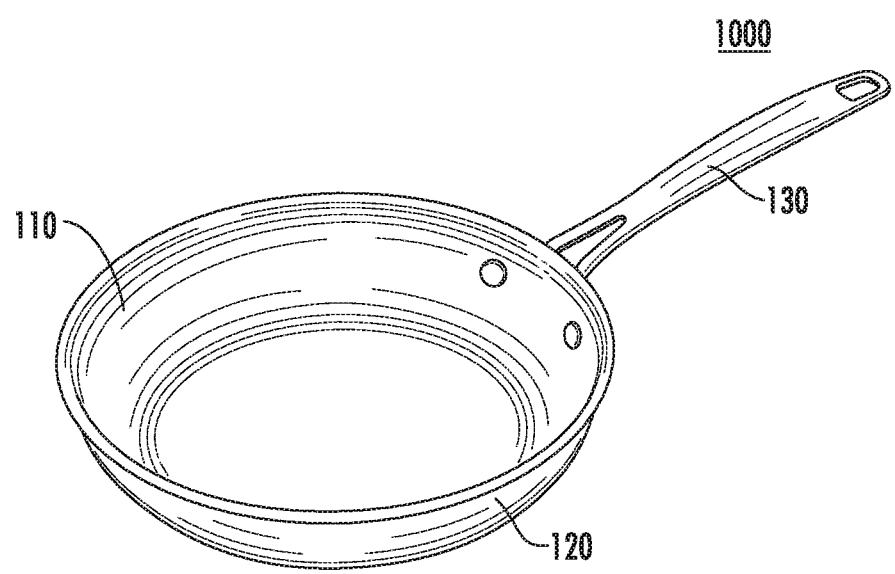
FIG. 10 is another color drawing of an isometric view of a bronze color ceramic coated pan having a bronze or copper color ceramic coating cooking surface on a embodiment of the pan with stainless steel handle according to an embodiment of the present invention.

FIG. 10 is another exemplary isometric perspective color drawing according to the preferred embodiment of the present invention 1000 which includes a bronze color ceramic coating 110 within the inner portion of an anodized aluminum pan 120 having a stainless steel handle 130 coupled to the outer edge of said anodized aluminum pan 120. The ceramic coating 110 may alternatively be of a copper color.

Figure 11:
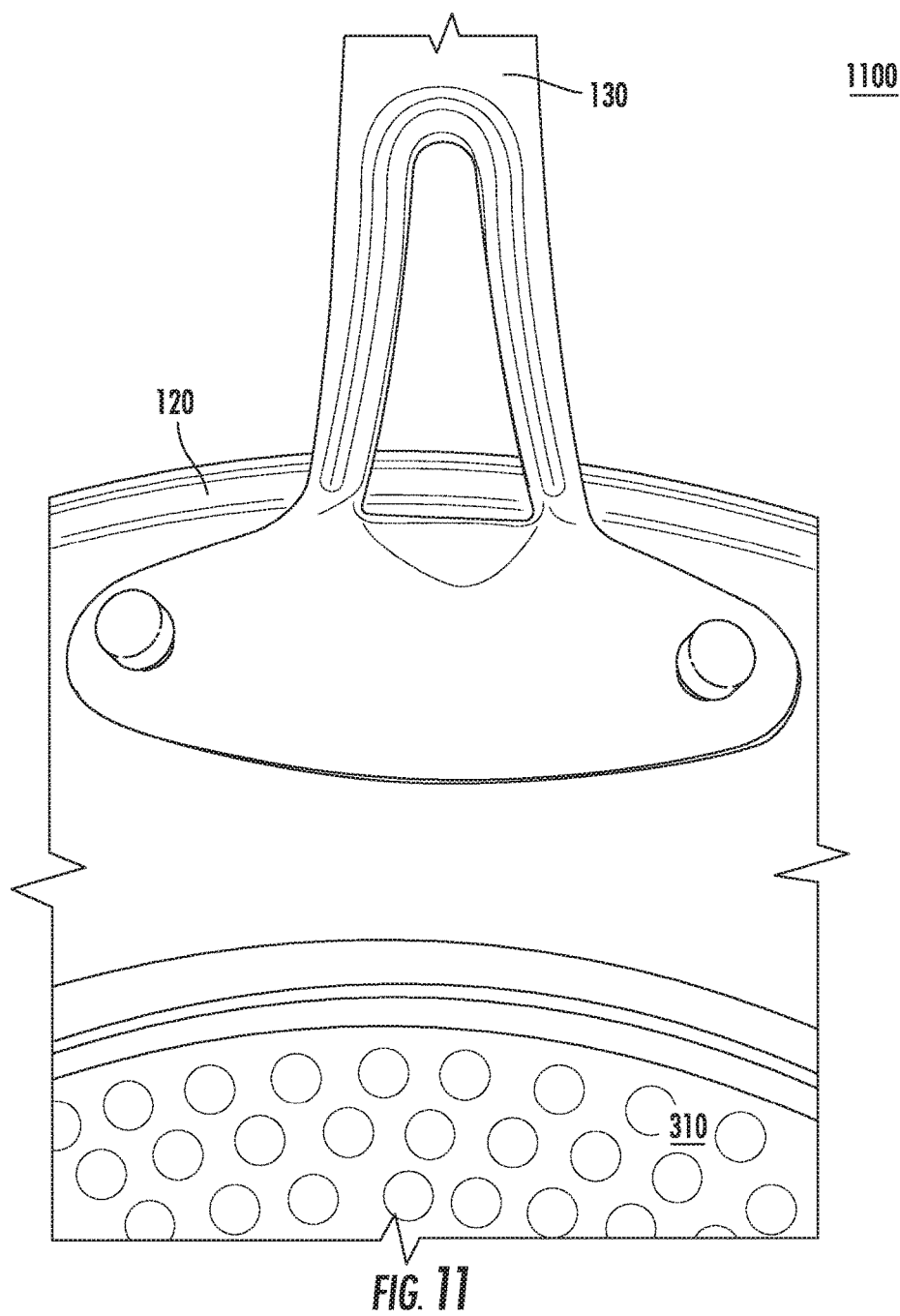
FIG. 11 is another color drawing of a closeup view of an exemplary stainless steel handle, the remainder of the bottom of the symmetric pan can be flat and unornamented in one exemplary embodiment, and in another exemplary embodiment, the bottom of the pan can include an improved stainless steel riveted surface for improved cooking on induction cooktops, according to an exemplary embodiment.

FIG. 11 is another exemplary isometric perspective color drawing of the back side of the pan according to the preferred embodiment of the present invention 1100 which includes an anodize aluminum pan 120 a exemplary stainless steel handle 130, which can be an exemplary y-shape, the remainder of the bottom of the symmetric anodized aluminum pan 120 can be flat and unornamented in one exemplary embodiment, and in another exemplary embodiment, the bottom of the pan can include an improved stainless steel base 310 for improved cooking on induction cooktops. Said stainless steel base 310 has a plurality of holes within the stainless steel base 310 filled by portions of said anodized aluminum pan 120 through impact bonding or extrusion. Said stainless steel base 310 may alternatively be of a base without a plurality of holes.

Figure 12:
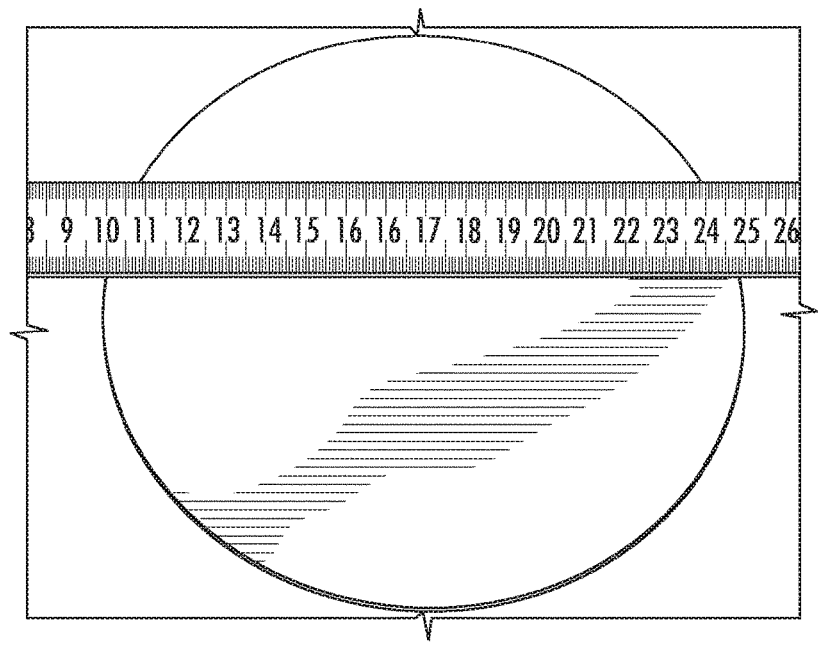
FIG. 12 is an example stainless steel plate cut in an exemplary disc circular shape, according to an exemplary embodiment.

FIG. 12 is an example stainless steel plate 1200 cut in an exemplary disc circular shape, according to an exemplary embodiment.

Figure 13:
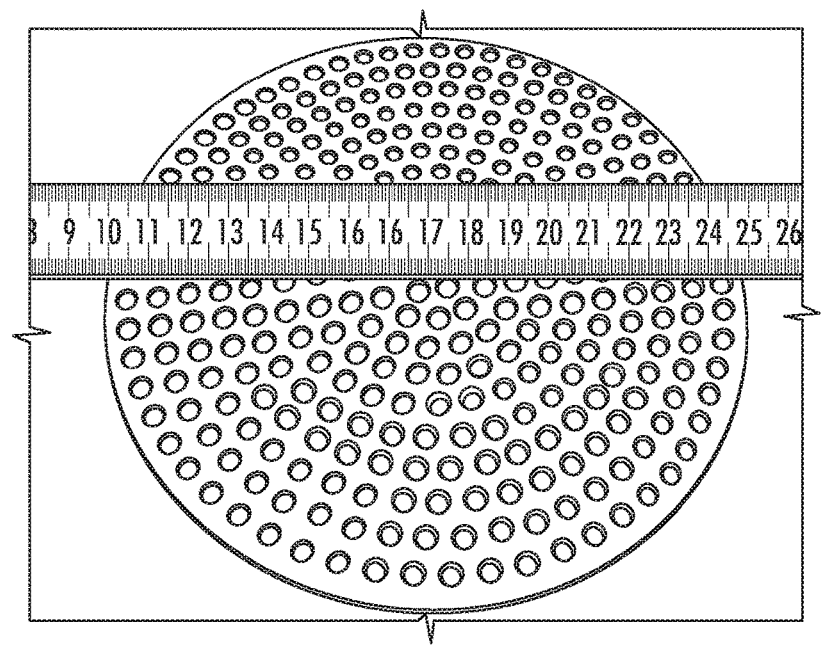
FIG. 13 is an example top view image of the exemplary stainless steel plate with an exemplary plurality of holes punched through the exemplary circular disc shaped plate, according to an exemplary embodiment.

FIG. 13 is an example top view image of the exemplary stainless steel plate with an exemplary plurality of holes punched through 1300 the exemplary circular disc shaped plate, according to an exemplary embodiment.

Figure 14:
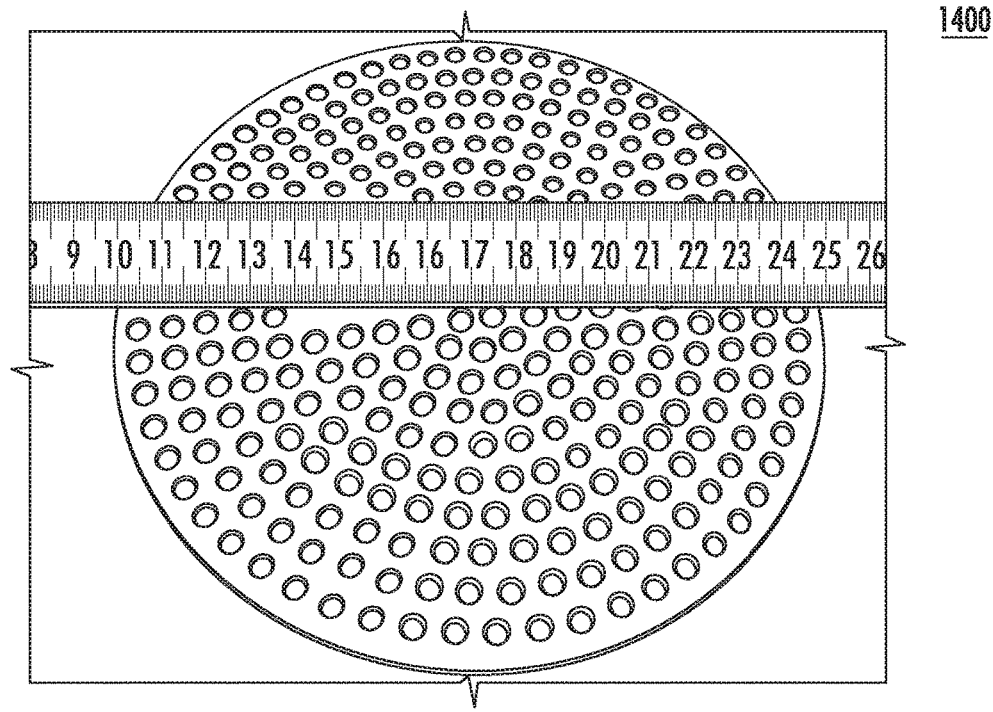
FIG. 14 is an example bottom view image of the exemplary stainless steel plate showing a bottom view of the exemplary plurality of holes punched through the exemplary circular disc shaped plate, according to an exemplary embodiment.

FIG. 14 is an example bottom view image of the exemplary stainless steel plate showing a bottom view of the exemplary plurality of holes punched through 1400 the exemplary circular disc shaped plate, according to an exemplary embodiment.

Figure 15:
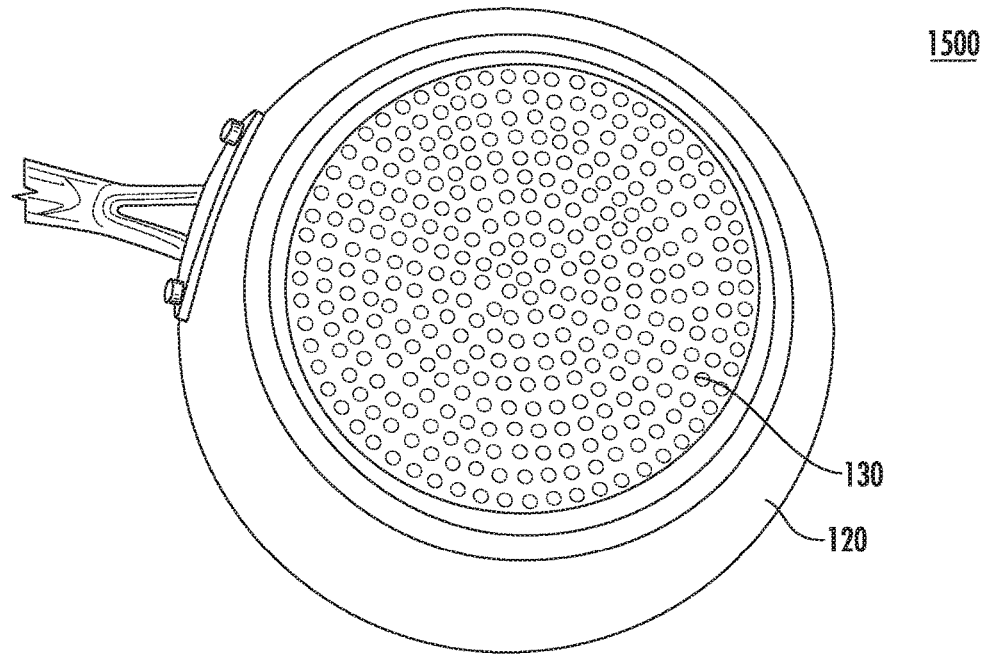
FIG. 15 depicts the plate coupled to the bottom of an exemplary anodized aluminum metallic pan, where the disc shaped stainless steel plate with the exemplary plurality of holes punched through have been bonded to the bottom of the aluminum pan by extruding the aluminum pan into the holes, or by impact bonding the aluminum and stainless steel plates to one another, according to various exemplary embodiments.

FIG. 15 depicts the exemplary stainless steel plate coupled to the bottom of an exemplary anodized aluminum metallic pan 1500, by which the disc shaped stainless steel plate with the exemplary plurality of holes punched through have been bonded to the bottom of the anodized aluminum metallic pan by extruding the anodized aluminum metallic pan into the plurality of holes, or by impact bonding the anodized aluminum metallic pan and stainless steel plate with a plurality of holes to one another. The coupling of the exemplary stainless steel plate coupled to the bottom of an exemplary anodized aluminum metallic pan 1500 creates said anodized aluminum pan 120 with a stainless steel base 310. Said stainless steel base 310 has a plurality of holes within the stainless steel base 310 filled by portions of said anodized aluminum pan 120 through impact bonding or extrusion. Said stainless steel base 310 may alternatively be of a base without a plurality of holes.

According to an exemplary embodiment, an exemplary stainless steel plate 1200 can include a grade of 430 stainless steel, said stainless steel plate 1200 used to bond to an exemplary anodized aluminum metallic pan to transform the anodized aluminum metallic pan into a usable anodized aluminum pan 120 with a stainless steel base 130 for use in induction cooking Said exemplary stainless steel plate 1200 can have any of various desirable thicknesses.

The exemplary but nonlimiting thickness of the stainless steel plate 1200 is 0.4 mm, and can have an exemplary 15 centimeter diameter shape and can include an exemplary preparation procedure, or process of making, which can include, in an exemplary embodiment: cutting (FIG. 12); punching (FIG. 13); and flanging (FIG. 14), according to an exemplary embodiment.

The reason for the exemplary dented circular openings and the holes effect is in order to provide better pressure into the aluminum pan, according to an exemplary embodiment.
Impact Bonding Process to Attach 430 Stainless Steel Disk to Anodized Aluminum Metallic Pan In one exemplary embodiment, it is possible to attach the 430 stainless steel plate 1200 without a plurality of circular punched through holes, e.g., by attaching the 430 stainless steel plate without the circle holes, according to another exemplary embodiment. To place the exemplary stainless steel plate 1200 without holes onto the exemplary anodized aluminum metallic pan, the exemplary process can include impact bonding and can require the thickness of the anodized aluminum metallic pan body to be greater than an exemplary, but nonlimiting 0.5 mm. The production efficiency could be lower using this exemplary embodiment rather than an alternative extrusion process. FIG. 12 illustrates the stainless steel plate 1200 without circular holes cut therethrough, for your reference. Exemplary bonding by exemplary impact bonding can normally require heat, according to an exemplary embodiment.

Figure 17:
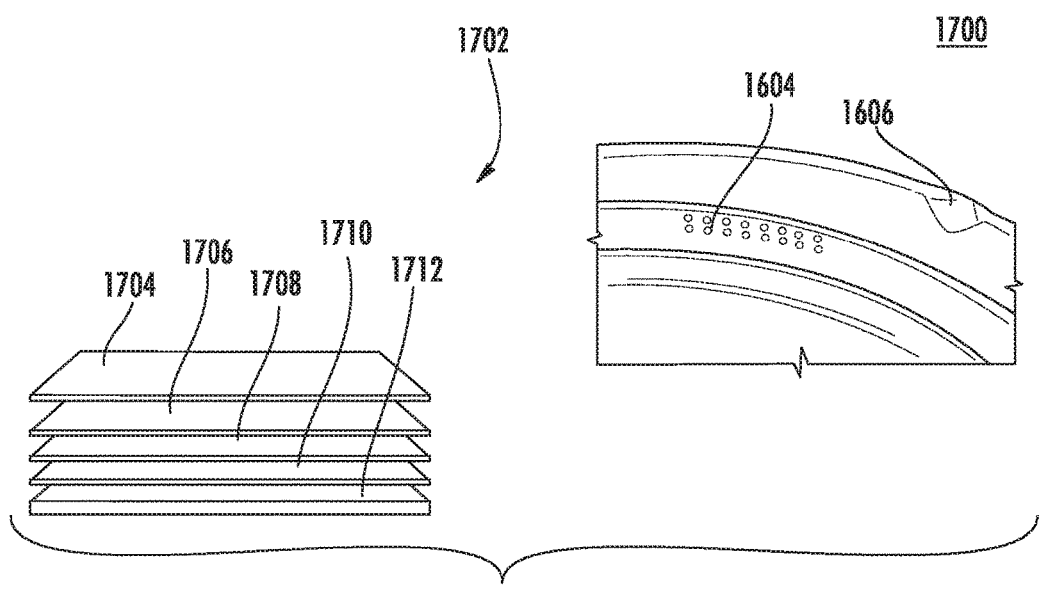
FIG. 17 depicts an illustration of an exemplary spout, strainer holes, and exemplary inner coating including an exemplary diamond-infused nano-ceramic coating, an exemplary ceramic primer coating, an exemplary premium grade stainless steel layer, an exemplary aluminum layer, and an exemplary stainless steel impact-bonded base, according to an exemplary embodiment.

Extrusion Bonding Process to Attach 430 Stainless Steel Disk to Anodized Aluminum Metallic Pan In one exemplary embodiment a process of extruding can be used wherein the anodized aluminum metallic pan bottom can be extruded onto the 430 stainless steel plate 1200, and the anodized aluminum metallic pan bottom can then form into the plurality of holes punched or cut through in the exemplary 430 grade stainless steel plate. Including the holes in the plate shown in 1300 of FIG. 13, and 1400 of FIG. 14, means that a lower pressure is needed to bond the anodized aluminum metallic pan with the stainless steel plate, according to the exemplary embodiment. FIG. 17 illustrates in illustrations 1700 an exemplary layering of aluminum and stainless steel, as well as an exemplary inner ceramic layer, according to an exemplary embodiment. The plurality of holes in the stainless steel plate thus provide efficiency in both material, and in heating required to bond the stainless steel and aluminum layers to one another, according to an exemplary embodiment. Using the holes in the SS plate and extruding allows bonding without requiring impact bonding which normally requires heat, since the extrusion process on the other hand can be done at room temperature. The plurality of holes in the stainless steel plate thus provide efficiency in both material, and in heating required to bond the stainless steel and aluminum layers to one another, according to an exemplary embodiment.

Stepped Machining of the Bottom Surface of the Anodized Aluminum Pan

According to an exemplary embodiment, because during the hard anodizing process, there can form irregular lines between the bottom of a formed pan and vessel, the bottom surface of the pan can be machined, sanded, and/or ground down to a flat, and/or shiny surface. Then we need make the stepped machining surface.

Figure 16:
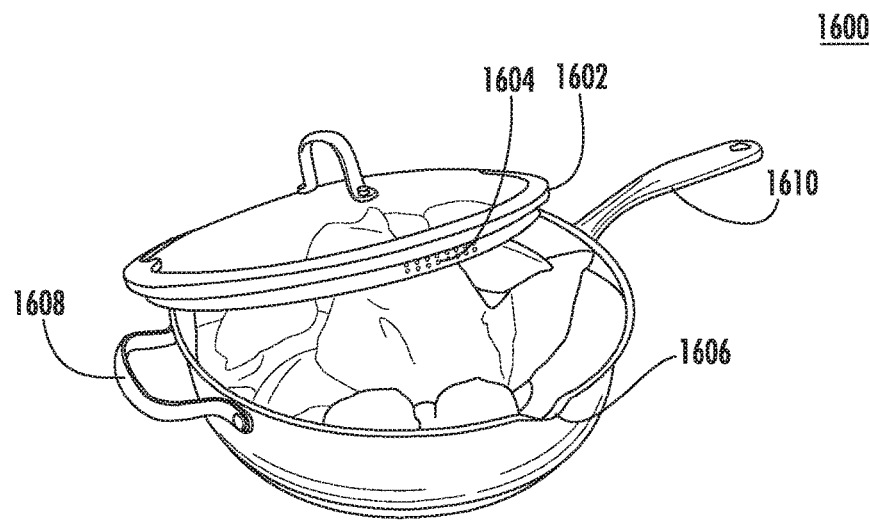
FIG. 16 depicts an exemplary everyday use pan including an exemplary silicone rim, exemplary plurality of strainer holes, a spout, and plurality of handles, according to an exemplary embodiment.

FIG. 16 depicts an exemplary everyday use pan 1600 including an exemplary silicone rim 1602, exemplary plurality of strainer holes 1604, an exemplary spout 1606, and plurality of handles 1608, 1610, according to an exemplary embodiment.

FIG. 17 depicts an illustration 1700 of an exemplary spout 1606, strainer holes 1604, and exemplary inner coating 1702 including an exemplary diamond-infused DURALON 2 nano-ceramic coating 1704, an exemplary ceramic primer coating 1706, an exemplary premium grade stainless steel layer 1708, an exemplary aluminum layer 1710, and an exemplary stainless steel impact-bonded base 1712, according to an exemplary embodiment.

Conclusion

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A induction cooking pan comprising:
    a pan;
    a handle coupled to said pan;
    wherein said pan comprises:
        a ceramic inner coated portion;
        a first metallic outer portion; and
        a second metallic outer portion;
            wherein said second metallic outer portion is at least one of extruded or impact bonded to said first metallic outer portion;
            wherein said second metallic outer portion comprises:
                a generally circular shape and comprising a plurality of punched openings there through; and
                wherein said plurality of punched openings have been at least one of:
                    impact bonded into a lower surface of said first metallic portion; or
                    extruded into a lower surface of said first metallic portion;
            wherein said first and second metallic outer portions have been machined substantially smooth.

2. The pan according to claim 1, wherein said pan is circular in shape.

3. The pan according to claim 1, wherein said plurality of punched openings comprise: punched circular openings.

4. The pan according to claim 1, wherein said first metallic outer portion comprises at least one of:
    an aluminum pan; or
    an anodized aluminum pan.

5. The pan according to claim 1, wherein said second metallic outer portion comprises at least one of:
    a stainless steel plate.

6. The pan according to claim 5, wherein said stainless steel plate comprises said plurality of punched openings, wherein said plurality of punched openings comprise:
    punched circular openings.

7. The pan according to claim 5, wherein said second metallic outer portion comprises said stainless steel plate, and said stainless steel plate comprises at least one of:
    a circular shape; or
    a similar shape to a bottom surface of said pan.

8. The pan according to claim 2, wherein said ceramic inner coated portion comprises:
    a ceramic coating comprising at least one of:
        a copper color; or
        a bronze color.

9. The pan according to claim 2, wherein said ceramic inner coated portion comprises:
    a ceramic coating comprising a copper color.

10. The pan according to claim 1, further comprising:
    a stainless steel handle.

11. The pan according to claim 10, wherein said stainless steel handle is riveted to said first metallic portion.

12. The pan according to claim 1, further comprising:
    a glass cover.

13. The pan according to claim 12, wherein said glass cover comprises a metallic handle.

14. The pan according to claim 12, wherein said glass cover further comprises:
    a metallic rim.

15. The pan according to claim 12, wherein said glass cover further comprises:
    a silicone rubber rim.

16. The pan according to claim 15, wherein said silicone rubber rim of said glass cover further comprises:

a plurality of holes configured for straining.

17. The pan according to claim 1, wherein said pan comprises at least one of:

a frying pan;
a sauce pan;
a pot;
a single handled pan;
a double handled pan;
a simmering pan; and
a boiling pan.

18. The pan according to claim 2, wherein the pan comprises a spout.

19. The pan according to claim 2, wherein the pan comprises a long handle and a u-shaped handle.

20. The pan according to claim 2, further comprising a cover comprising a vent.

21. The pan according to claim 2, wherein said ceramic inner coated portion comprises:

a ceramic, coating comprising a bronze color.

22. The pan according to claim 2, wherein said ceramic inner coated portion comprises:

a ceramic coating comprising a copper color.

* * * * *